Feb. 8, 1966  KIYOSHI INOUE  3,234,353
WELDING PROCESS AND APPARATUS
Filed Sept. 21, 1962  3 Sheets-Sheet 1
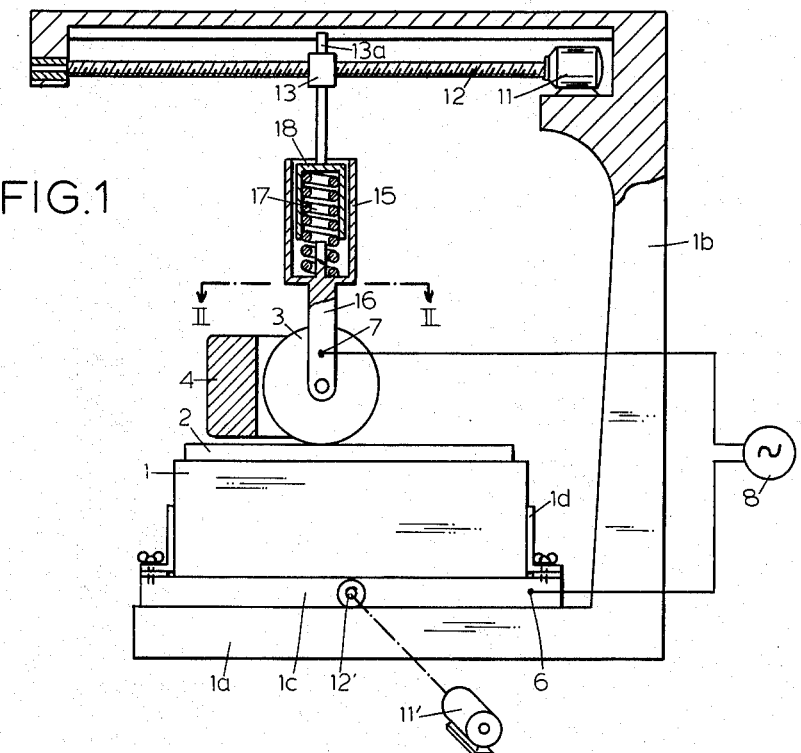
KIYOSHI INOUE
INVENTOR.
BY Karl F. Ross
AGENT Feb. 8, 1966   KIYOSHI INOUE   3,234,353
WELDING PROCESS AND APPARATUS
Filed Sept. 21, 1962   3 Sheets-Sheet 3
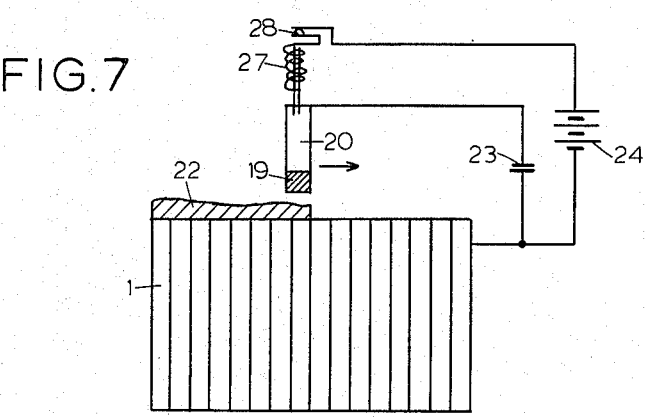
FIG.7
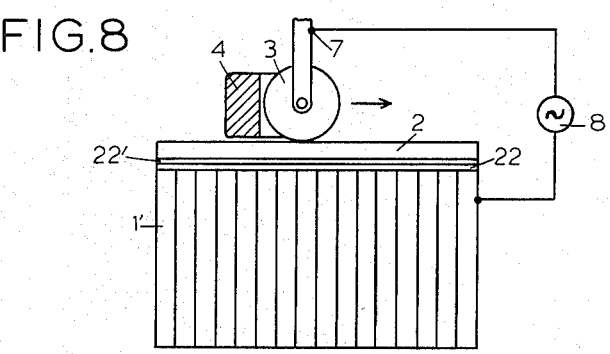
FIG.8
FIG.9
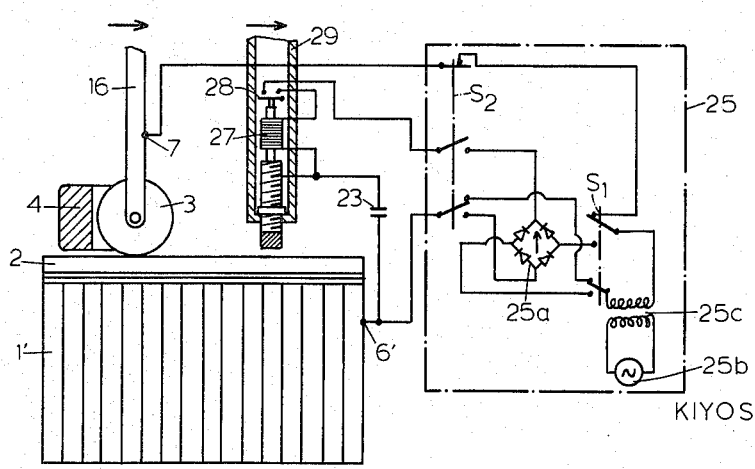
KIYOSHI INOUE
INVENTOR.
BY Karl F. Ross
AGENT 3,234,353
WELDING PROCESS AND APPARATUS
Kiyoshi Inoue, 182 3-chome, Tamagawayoga,
Setagaya-ku, Tokyo, Japan
Filed Sept. 21, 1962, Ser. No. 225,270
Claims priority, application Japan, Mar. 13, 1959,
34/7,717, 34/7,718; Mar. 23, 1959, 34/8,789,
34/8,790
5 Claims. (Cl. 219—82)

My present invention relates to a process and an apparatus for electrically welding together two metallic bodies along adjoining surfaces thereof. This application is a continuation-in-part of my copending application Ser. No. 14,727 filed March 14, 1960.

The general object of this invention is to provide an improved process and apparatus for skin-welding such bodies over a considerable portion of their adjoining surfaces, e.g. along an elongated seam.

If each of the two bodies to be joined has an extended surface which is substantially parallel and reasonably close to the interface defined by the two adjoining surfaces, the weld point can be progressively displaced along that interface by the concurrent movements of two contact electrodes (e.g. of the roller type) over the two exposed surfaces. Reference in this connection may be made to my copending application Ser. No. 18,212 filed Mar. 14, 1960, now Patent No. 3,060,306 issued Oct. 23, 1962.

In many instances the use of a second movable electrode is impractical or ineffective because of the configuration and/or the thickness of one of the two bodies. This situation exists, for example, in the welding of a relatively thin metal facing to a honeycomb-type structure which lacks a smooth guiding surface for such electrode. The accurate localization of the welding current along the interface then becomes difficult as the current, even if fed into one of the bodies by a displaceable contact electrode, tends to spread from the point of contact within that body along lines of flow which for the most part pass through the weld previously made so that little energy is available for the production of a new weld further along the interface.

A more specific object of my invention, therefore, is to provide means in a welding apparatus of the type referred to, particularly but not exclusively one having a single movable electrode, for concentrating the flow of welding current in the vicinity of the interface of the two bodies to be joined.

I have found, in accordance with this invention, that the desired concentration of current flow in the vicinity of two adjoining surfaces of two bodies to be welded can be realized by the positioning of a highly magnetically permeable element close to one of these bodies (preferably the thinner of the two) in the region of an initial weld formed on a limited area of these surfaces. The proximity of such element effectively increases the inductance of the current paths remote from the adjoining surfaces so that an alternating voltage imposed upon the two bodies will give rise to a current which will preferentially flow over paths of lower impedance. If the frequency of the alternating current is chosen high enough, only a minor part of the current will be able to flow even in the immediate vicinity of the interface in a direction parallel thereto so as to pass through the initial weld point; the major part of the current will then traverse the interface generally perpendicularly at some other location, e.g. in the region of the point of contact between the aforementioned movable electrode and the body engaged thereby. If, on the other hand, a relatively low frequency is chosen, the current will flow with increased density along both sides of the interface and will generate considerable heat which can be utilized to preheat the surfaces to be welded, the welding proper being then accomplished with relatively low energy by the passage of current, preferably from another electrode, through the preheated zone; the welding current proper will in this case advantageously be an alternating current of a frequency different from, e.g. higher than, that of the preheating current.

In many instances it will be desirable to carry out the process of this invention on a pair of metallic bodies of which either or both has been surface-conditioned by means of a bond-promoting alloying agent, such as a low-melting metal or a semiconductor, which has been deposited by an electric-arc discharge on the surface of such body so as to interdiffuse therewith as claimed in my copending application Ser. No. 225,432 filed on even date herewith.

The invention will be described hereinafter in greater detail, reference being made to the accompanying drawing in which:

FIG. 1 is a somewhat diagrammatic side-elevational view of an apparatus embodying my invention;

FIG. 2 is a sectional detail view taken along line II—II of FIG. 1;

FIGS. 5a and 5b are sectional views showing representative work pieces adapted to be welded to a metallic facing or the like by the apparatus of FIG. 1;

FIG. 7 is another fragmentary side-elevational view illustrating the arc deposition of a surface-conditioning agent upon one of the bodies to be welded by an apparatus as shown in the FIGS. 1–4;

FIG. 8 is another side-elevational view showing the welding of the treated body of FIG. 7 onto another body by an assembly similar to that illustrated in FIGS. 1–4; and FIG. 9 is a side-elevational view of an apparatus combining the features of FIGS. 7 and 8, together with a circuit diagram therefor.

Figure 3:
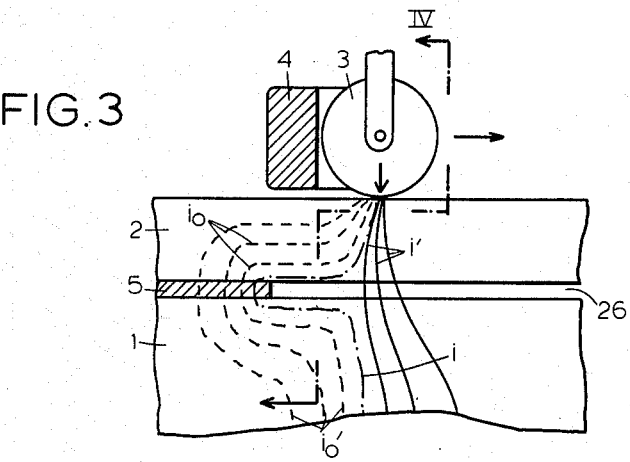
FIG. 3 is a fragmentary side-elevational view illustrating the current flow in the apparatus of FIGS. 1 and 2.

As shown in FIGS. 1–4, a thin metal plate 2 is placed on a heavier metallic body 1 to which it is to be welded as a facing therefor. Body 1, here shown as a planar slab, is clamped at 1d to a conductive base 1c which in turn is supported on a frame 1a. This frame is formed with an upright 1b carrying a motor 11 which drives a horizontal lead screw 12 overlying the two bodies 1, 2 to be welded. A nut 13, threadedly engaging the lead screw 12 and guided by a stud 13b in a horizontal channel 1e of frame 1a, is rigid with a depending arm 14 which terminates in a prismatic spring housing 18. A complementary spring housing 15 surrounds the housing 18 and with it encloses a compression spring 17 exerting downward pressure upon a fork 16 which is rigid with housing 15 and straddles an electrode roller 3 bearing upon the plate 2. Fork 16 also supports a generally U-shaped element 4 of high magnetic permeability, made of iron or other ferromagnetic material, which trails behind the electrode 3 as the latter is displaced from left to right (as viewed in FIG. 1) by the operation of motor 11.

Alternating current is supplied to the electrode 3 and to the work piece 1 by a voltage source 8 connected to the base 1c at 6 and to the fork 16 at 7. Another electromotor 11' serves to displace the table 1c, via a lead screw 12′, in a direction perpendicular to lead screw 12.

The operation of this apparatus will now be described with reference to FIGS. 3 and 4. In these figures the two bodies 1 and 2 are shown spaced apart by a small clearance 26 designed to symbolize their electrical separation by surface roughness and/or oxide layers or the like. At 5 this clearance is shown bridged by an initial weld formed between the two bodies.

If the magnetically permeable element 4 were not present, current would flow from the point of contact between electrode 3 and body 2 into body 1 over a variety of paths which have been designated $i_0$ (shown in dotted lines) and which for the most part pass through the weld 5. It will be noted that the paths $i_0$ are distributed substantially uniformly throughout the thickness of plate 2; their distribution within body 1 will depend, of course, upon the size and configuration of the latter as well as upon the location of the return point 6 (FIG. 1). Because the resistance of the weld 5 is much lower than the mainly capacitive impedance of other regions of the interface represented by clearance 26, very little current will bypass the weld 5 under these circumstances.

Figure 4:
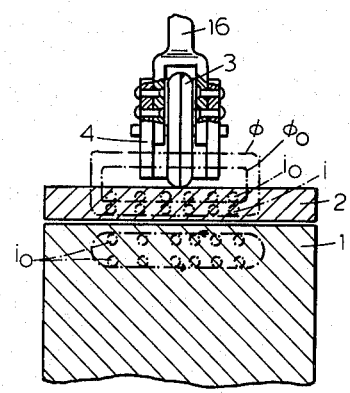
FIG. 4 is a sectional view taken substantially on line IV—IV of FIG. 3.

With the element 4 in the position illustrated, however, a magnetic flux path is provided which has been illustrated in FIG. 4. The greatest flux, symbolized by the lines $\mathscr{F}$ and $\mathscr{F}_o$, will link the current paths $i_0$ which are closest to the upper surface of plate 2; the smallest flux, represented by alone, links the paths $i$ which pass close to the interface 26 within body 2. It will thus be apparent that the current flowing at $i_0$ will encounter a much higher inductive impedance than the current at $i$ while both sets of paths $i$, $i_0$ will have an impedance which is high, at least for the higher frequencies, compared with the impedance of the paths $i'$ which extend generally perpendicularly across the interface 26. Thus, the element 4 causes the high-frequency welding current to be concentrated at $i'$ so that, upon displacement of electrode 3 from left to right with the element 4 trailing behind, the weld point will be progressively shifted from the area 5 along the entire interface 26 to produce a continuous and durable bond. It will be apparent that the current flow at $i'$ is further facilitated by the pressure which the electrode 3 exerts upon the plate 2 under the action of its biasing spring 17.

It may be mentioned that the body 1 shown in FIGS. 1, 3 and 4 may be replaced by work pieces of other configurations, such as the tube bank 1A in FIG. 5a or the honeycomb structure 1B in FIG. 5b. The body 1′ illustrated in subsequent figures is likewise representative of any such structure.

Figure 6:
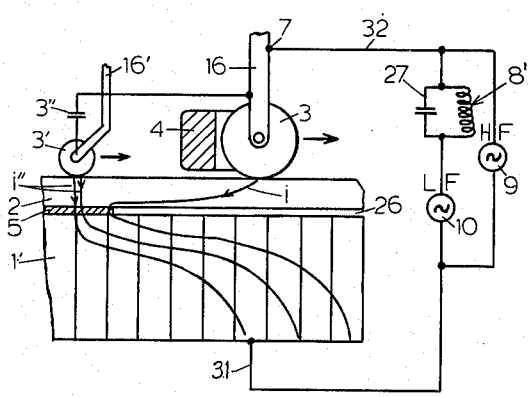
FIG. 6 is a view generally similar to FIG. 3, showing a modification.

If the applied alternating voltage is of relatively low frequency, considerable current may flow at $i$ along the interface 26 and will generate appreciable heat since the increased current density effectively raises the ohmic resistance in its path. This heat, according to a further feature of the invention, can be utilized to preheat the interface 26 in a region still to be welded as has been illustrated more fully in FIG. 6. There the principal electrode 3 has been supplemented by an auxiliary electrode 3′ whose support has been partly illustrated at 16′ and which may be spring-pressed and guided in the same manner as roller 3 with the aid of a common lead screw. In this instance the power supply 8′ is shown to comprise two alternating-current generators 9 and 10 with a relatively high and a relatively low output frequency respectively. These generators are connected in parallel between two conductors 31, 32 of which the former terminates at 6′ on the work piece 1′ whereas the latter is connected to the electrode support 16 at 7 and to the electrode 3′ through the intermediary of a condenser 3″. A parallel-resonant circuit 27, tuned to the output frequency of source 9, serves to block the flow of the output of that source through the low-frequency source 10 while permitting the lower-frequency currents from the latter source to reach the energizing circuit 31, 32 of the electrodes along with the high-frequency current from source 9. Condenser 3″ forms part of another parallel-resonant circuit which in addition includes the inductive path through body 2 past the ferromagnetic element 4; the last-mentioned resonant circuit is tuned to substantially the output frequency of source 10 so as to block the low-frequency currents thereof. Thus, the low-frequency output of source 10 will flow mainly along the afore-described path $i$ which passes within body 2 immediately above the interface 26 and returns within body 1′ to the tap 6′ thereof while flowing for the most part directly below this interface by virtue of the well-known proximity effect, thereby preheating this interface for subsequent welding; the high-frequency output of source 9 traverses the body 2 and the clearance 26 substantially perpendicularly at $i''$ to extend the weld 5 progressively within the preheated zone as the two electrodes 3, 3′ are concurrently displaced under pressure over plate 2 with the ferromagnetic element 4 trailing behind electrode 3. The condenser 3″ and the resonant circuit 27 as well as the frequencies of generators 9 and 10 are preferably adjustable to suit different operating conditions. Frequencies of 4–5 kc. for the low-frequency source 10 and of 400–500 kc. for the high-frequency source 9 have been found highly suitable.

In FIG. 7 I have illustrated a method of preparing a metallic work piece, such as the body 1′, for subsequent welding by an apparatus of the type shown in FIGS. 1–4 or 6. Such preparation will be desirable particularly in the case of work pieces which, because of surface peculiarities and/or the refractory character of their materials, cannot be easily welded by conventional means. To facilitate the welding of such body to another metallic body of like or different material, I coat its surface with a layer 22 of a bond-promoting surface conditioner which is readily alloyable with the metal of the body and can be deposited by an arc discharge so as to interdiffuse with that metal; suitable agents of this character include low-melting metals (e.g. tin) and semiconductors (e.g. germanium). To form the layer 22 I displace a carrier electrode 20 across the surface of body 1′, this electrode being provided with a tip 19 made from the substance to be deposited. The opearting circuit comprises a condenser 23 connected between body 1′ and electrode 20, a source 24 of direct current and an electromagnetic vibrator connected across source 24 in series with condenser 23, this vibrator including an electromagnet 21 and a circuit breaker 28 in series with the magnet coil. The armature of magnet 21 is secured to electrode 20 in such manner that its tip 19 momentarily contacts the work surfaces when the magnet is de-energized.

In operation, condenser 23 charges through the coil of magnet 21 which lifts the electrode 20 off the work piece 1′ and concurrently opens the circuit breaker 28 whereupon the tip 19 drops back upon the work surface and condenser 23 discharges rapidly through it; such discharge is interrupted by the reclosure of circuit breaker 28 which re-energizes the magnet 21 to elevate the electrode 20 again above the work piece. The resulting intermittent arc discharge forms the layer 22 from the material of tip 19 (the thickness of this layer having been exaggerated in the drawing for the sake of clarity) and produces enough heat to cause the partial diffusion of the layer material into the metal of body 1′.

FIG. 8 illustrates how the body 1′ with its layer 22 and a plate 2 with a similarly formed layer 22′ are skin-welded together by electrode 3 with trailing ferromagnetic element 4 as heretofore described.

FIG. 9 shows an apparatus embodying the features illustrated in FIGS. 7 and 8. Electrode 20 is shown adjustably positioned in a prismatic housing 29 which also encloses the vibrator 21, 28 and may be displaced across the top of work piece 1', or across the plate 2 held in inverted position on that work piece, in the same manner as electrode 3, as has been indicated by the arrows, to form the layer 22 or 22'. Thus, housing 29 could be suspended from a nut engaging the lead screw 12 of FIG. 1 or another such lead screw. The energizing circuit 25 for this apparatus includes an alternating-current source 25b working into a transformer 25c, a rectifier 25a and a pair of multicontact switches $S_1$ and $S_2$. In the illustrated switch position, in which electrode 3 is operative, switches $S_1$ and $S_2$ connect the secondary of transformer 25c directly across points 6' and 7 while the electrode 19 and its charging condenser 23 are disconnected from the power supply. In the alternate switch position the input to vibrator 21 and condenser 23 is connected across the output of rectifier 25a while the electrode 3 is without power.

The process described in conjunction with FIGS. 7–9 can be applied to such refractory materials as titanium or tantalum, to surface-oxidized materials such as aluminum, to metals of high thermal conductivity such as silver or platinum, and to almost any other metal or alloy which is not readily weldable by the usual methods.

I claim:

1. In a process for welding together two metallic bodies along two adjoining surfaces thereof, wherein an initial weld is formed on a limited area of said adjoining surfaces by the passage of an alternating current between said bodies, the steps of passing an alternate current of relatively low frequency between said bodies, concentrating the flow of said low-frequency current in the vicinity of said adjoining surfaces by positioning a highly magnetically permeable element close to one of said bodies in the region of said initial weld, maintaining a sufficient flow of said low-frequency current along said adjoining surfaces to preheat a zone thereof adjacent said initial weld, and forming a further weld in the zone so preheated by passing an alternating current of relatively high frequency therethrough.

2. A process for the resistance-welding together of two metallic bodies along two adjoining surfaces thereof, comprising the steps of displacing an electrode along an exposed surface of one of said bodies substantially parallel to said adjoining surfaces while continuously applying an alternating voltage between said electrode and the other of said bodies; applying pressure upon said exposed surface with said electrode whereby said bodies are brought close together along their adjoining surfaces in the region of the point of contact between said electrode and said exposed surface; trailing a highly magnetically permeable element behind said electrode at a short distance from said point of contact and with close spacing from said exposed surface whereby the concentration of the alternating current due to said voltage is increased at said region, closely to and rearwardly thereof, the frequency of said alternating current being chosen low enough to enable the flow of a substantial preheating current along said adjoining surfaces; and trailing an additional electrode behind said element along said exposed surface while passing a welding current of relatively high frequency through the preheated surfaces by way of said additional electrode.

3. In a welding apparatus, in combination, support means for two abutting metallic bodies adapted to be welded together along their interface, a first electrode contacting one of said bodies, feed means for displacing said first electrode relatively to said bodies, a source of relatively low-frequency alternating current connected across said first electrode and the other of said bodies for preheating said bodies along said interface in the direction of advance of said first electrode, a passive element of high magnetic permeability disposed adjacent said first electrode rearwardly thereof, a second electrode disposed rearwardly of said first electrode and displaceable therewith, and a source of relatively high-frequency alternating current connected across said second electrode and said other of said bodies for welding said bodies together.

4. The combination according to claim 3 wherein said sources of alternating current are part of an energizing circuit including a first and a second conductor connected across both said sources in parallel, said energizing circuit further including first impedance means connected between one of said conductors and one of said sources for blocking the output frequency of the other of said sources, said first conductor being connected to said other of said bodies, said second conductor being connected to both said electrodes, said energizing circuit also including second impedance means connected between said second conductor and one of said electrodes for blocking the output frequency of said one of said sources.

5. A welding apparatus comprising a main roller electrode for supplying preheating current to a body to be welded while bearing upon and moving along a surface of said body; a highly magnetically permeable element juxtaposed with said electrode for inductively changing the alternating-current impedance of said body adjacent said surface; an auxiliary roller electrode displaceable with said main electrode along said surface for supplying welding current to said body; and a power source for simultaneously supplying alternating currents of different frequencies, respectively, to said two electrodes.

References Cited by the Examiner

UNITED STATES PATENTS

| 1,138,154 | 5/1915 | Stanley | 219—86 |
| 1,145,413 | 7/1915 | Hatch | 219—86 |
| 1,640,449 | 8/1927 | Hewlett | 219—83 X |
| 1,740,381 | 12/1929 | Weed | 219—123 |
| 1,827,657 | 10/1931 | Ipsen | 219—123 |
| 2,694,129 | 11/1954 | Yenni | 219—123 |
| 2,882,384 | 4/1959 | Foster | 219—123 X |

ANTHONY BARTIS, *Acting Primary Examiner.*

RICHARD M. WOOD, *Examiner.*